US012327717B2

(12) United States Patent
Nurmi et al.

(10) Patent No.: US 12,327,717 B2
(45) Date of Patent: Jun. 10, 2025

(54) SYSTEMS AND METHODS FOR ANALYZING SAMPLES

(71) Applicant: CMP Scientific Corp., Brooklyn, NY (US)

(72) Inventors: Paul Nurmi, Gardnerville, NV (US); Joshua Wiley, Auburn, CA (US); Qiangwei Xia, Brooklyn, NY (US)

(73) Assignee: CMP Scientific Corp, Brooklyn, NY (US)

( * ) Notice: Subject to any disclaimer, the term of this patent is extended or adjusted under 35 U.S.C. 154(b) by 419 days.

(21) Appl. No.: 18/048,049

(22) Filed: Oct. 20, 2022

(65) Prior Publication Data

US 2024/0047189 A1 Feb. 8, 2024

Related U.S. Application Data

(63) Continuation-in-part of application No. 17/816,734, filed on Aug. 2, 2022.

(51) Int. Cl.
*H01J 49/06* (2006.01)
*H01J 49/26* (2006.01)

(52) U.S. Cl.
CPC .......... *H01J 49/067* (2013.01); *H01J 49/061* (2013.01); *H01J 49/26* (2013.01)

(58) Field of Classification Search
USPC .......................................................... 250/281
See application file for complete search history.

(56) References Cited

U.S. PATENT DOCUMENTS

| | | | | |
|---|---|---|---|---|
| 6,005,245 | A | 12/1999 | Sakairi et al. | |
| 2005/0269503 | A1 | 12/2005 | Sheehan et al. | |
| 2006/0118715 | A1 * | 6/2006 | Schneider .............. | H01J 49/06 250/290 |
| 2016/0189946 | A1 | 6/2016 | Nishiguchi et al. | |

OTHER PUBLICATIONS

International Search Report and Written Opinion dated Mar. 13, 2024 for PCT/US23/77403 (8 pages).

* cited by examiner

*Primary Examiner* — Kiet T Nguyen
(74) *Attorney, Agent, or Firm* — Scale LLP

(57) ABSTRACT

Systems and methods for analyzing samples are provided. In some embodiments, a mass spectrometer may include a source configured to output a plurality of particles, a tube having a central axis, and a skimmer. In some embodiments, the skimmer may include an aperture arranged to receive the one or more charged particles deflected by a deflector and a contact surface comprising an intersection point that intersects the central axis of the tube. The intersection point may be spaced from the aperture by a distance of at least 5 mm.

20 Claims, 10 Drawing Sheets

SYSTEMS AND METHODS FOR ANALYZING SAMPLES

CROSS-REFERENCE TO RELATED APPLICATIONS

This application is a continuation-in-part of U.S. patent application Ser. No. 17/816,734, filed Aug. 2, 2022, which is incorporated by reference herein in its entirety.

FIELD OF THE DISCLOSURE

This disclosure relates to systems and methods for analyzing samples. More particularly, this disclosure relates to improved mass spectrometry devices, components therefore, and methods of use thereof.

BACKGROUND

Mass spectrometry is an analytical technique that can be used to analyze samples. Among other applications, mass spectrometry can be used to analyze the composition of a sample. Mass spectrometers may operate by applying energy to a sample, causing the sample to emit ions. The ions may travel through an electric field and their collision with a detector may be measured. The position at which the particles are detected or the time required for the ion to reach the detector may vary with the mass of the ion. Accordingly, by measuring these parameters, a mass of the ions may be determined, and a composition of the sample may be inferred.

Time-of-flight mass spectrometers operate by measuring the time required for an ion to travel to a detector. Time-of-flight mass spectrometers may include a particle guide that directs ions toward a detector. Certain particle guides, called quadrupoles, may include segments having four electrodes that are collectively disposed around a central channel through which ions may travel. Mass spectrometers generally have multiple chambers at different pressures, which has traditionally created a need for multiple particle guides. Particle guides are complex electrical devices, and requiring multiple particle guides can significantly increase cost and manufacturing difficulty. There may also be a risk that the multiple quadrupoles will not be correctly aligned or synchronized, which can reduce performance.

Additionally, as ions are directed to enter a particle guide, droplets and other particles may become deposited around the entrance to the particle guide, which can create contamination risk and negatively impact the accuracy of future measurements.

Accordingly, there is a need for systems and methods that accurately analyze sample composition with improved reliability and lower cost. Further, there is a need for mass spectrometers having improved skimmer arrangements that reduce the risk of contamination and improve measurement accuracy.

SUMMARY

The following description presents a simplified summary in order to provide a basic understanding of some aspects described herein. This summary is not an extensive overview of the claimed subject matter. It is intended to neither identify key or critical elements of the claimed subject matter nor delineate the scope thereof.

In some embodiments, a mass spectrometer may be provided. In some embodiments, the mass spectrometer may include a source configured to output one or more ions, a plurality of chambers having different pressures, a detector configured to detect the one or more ions, and a particle guide. The plurality of chambers may include at least a first chamber having a first pressure that is less than atmospheric pressure and a second chamber having a second pressure that is less than the first pressure. In some embodiments, the particle guide may include a conduit through which the one or more ions may travel an entire length of the particle guide. The conduit may be disposed within at least the first chamber and the second chamber. The particle guide may further include a housing surrounding the conduit. In some embodiments, the housing may include a first open section comprising a first vent, the first vent defining a passage between the first chamber and the conduit, a second open section comprising a second vent, the second vent defining a passage between the second chamber and the conduit, and a closed section disposed between the first open section and the second open section, at least part of the closed section being disposed at a juncture between the first chamber and the second chamber. The one or more ions may be configured to travel from the source, through at least the first chamber, the second chamber, and the particle guide, and to the detector.

In some embodiments, the conduit may include a quadrupole. In some embodiments, the quadrupole may include a plurality of quadrupole segments, each quadrupole segment being configured to generate an electric field that can be controlled independently of the other quadrupole segments. The plurality of quadrupole segments may be collectively configured to reduce a kinetic energy of the one or more ions as the one or more ions transit the length of the particle guide.

In some embodiments, the quadrupole may include at least four linear components disposed axially along the length of the conduit. A central passage may extend between the four linear components, and the central passage may be open such that the one or more ions may transit the length of the conduit by traveling through the central passage. The passage defined by the first vent may extend between two of the four linear components to the central passage.

In some embodiments, the particle guide may have a fluid conductance defined by an open cross-sectional area of the conduit and a length of the closed section, the fluid conductance being less than one liter per second.

In some embodiments, a sealing ring may be disposed between the closed section of the housing and the juncture between the first chamber and the second chamber. In some embodiments, a third chamber may have a third pressure that is less than the second pressure of the second chamber. In some embodiments, the particle guide may terminate at a lens gate disposed at a juncture between the second chamber and the third chamber, and the lens gate may be configured to selectively allow the one or more ions to enter the third chamber.

In some embodiments, a particle guide configured to be disposed in a mass spectrometer may be provided. The particle guide may be configured to be disposed in a mass spectrometer that includes a plurality of chambers having different pressures including at least a first chamber having a first pressure that is less than atmospheric pressure and a second chamber having a second pressure that is less than the first pressure. In some embodiments, the particle guide may include a conduit through which the one or more ions may travel an entire length of the particle guide. The conduit may be configured to be disposed within at least the first chamber and the second chamber. The particle guide may further include a housing surrounding the conduit. In some embodiments, the housing may include a first open section comprising a first vent that is configured to define a passage between the first chamber and the conduit when the first open section is disposed in the first chamber. The housing may further include a second open section comprising a second vent that is configured to define a passage between the second chamber and the conduit when the second open section is disposed in the second chamber. The housing may further include a closed section disposed between the first open section and the second open section. At least part of the closed section may be configured to be disposed at a juncture between the first chamber and the second chamber.

In some embodiments, the particle guide may include a quadrupole. The quadrupole may include a plurality of quadrupole segments, each quadrupole segment being configured to generate an electric field that can be controlled independently of the other quadrupole segments. The plurality of quadrupole segments may be collectively configured to reduce a kinetic energy of the one or more ions as the one or more ions transit the length of the particle guide.

In some embodiments, the quadrupole may include four linear components disposed axially along the length of the particle guide. A central passage may extend between the four linear components, the central passage being open such that the one or more ions may transit the length of the particle guide by traveling through the central passage. The passage defined by the first vent may extend between two of the four linear components to the central passage. In some embodiments, the closed section may have a fluid conductance defined by an open cross-sectional area of the central passage and a length of the closed section, the fluid conductance being less than one liter per second.

In some embodiments, a sealing ring may be disposed between the closed section of the housing and the juncture between the first chamber and the second chamber.

In some embodiments, the particle guide may terminate at a lens gate that is configured to be disposed at a juncture between the second chamber and a third chamber of the mass spectrometer. The third chamber may have a third pressure that is less than the second pressure of the second chamber. The lens gate may be configured to selectively allow the one or more ions to enter the third chamber.

In some embodiments, a method for analyzing a sample may be provided. In some embodiments, the method may be performed using a mass spectrometer including a plurality of chambers having different pressures including at least a first chamber having a first pressure that is less than atmospheric pressure and a second chamber having a second pressure that is less than the first pressure. In some embodiments, the method may include applying energy to the sample to generate one or more ions, transiting the one or more ions through a particle guide disposed at least partially in the first chamber and the second chamber of the mass spectrometer, and detecting an arrival of the one or more ions at a detector. In some embodiments, the particle guide may include a conduit through which the one or more ions may travel an entire length of the particle guide and a housing surrounding the conduit. In some embodiments, the housing may include a first open section comprising a first vent, the first vent being configured to define a passage between the first chamber and the conduit. The housing may further include a second open section comprising a second vent, the second vent being configured to define a passage between the second chamber and the conduit. The housing may further include a closed section disposed between the first open section and the second open section, at least part of the closed section being disposed at a juncture between the first chamber and the second chamber.

In some embodiments, a mass spectrometer may be provided. The mass spectrometer may include a source configured to output a plurality of particles which may include one or more charged particles and one or more uncharged particles. The mass spectrometer may further include a tube having a central axis, a deflector that is configured to be charged to deflect the one or more charged particles, and a skimmer. The skimmer may include an aperture arranged to receive the one or more charged particles deflected by the deflector, and a contact surface comprising an intersection point that intersects the central axis of the tube, the intersection point being spaced from the aperture by a distance of at least 5 mm. The mass spectrometer may further include a particle guide configured to transit the one or more charged particles along a length of the particle guide, and a detector configured to detect the one or more charged particles. In some embodiments, the one or more charged particles may be configured to: (i) travel through the tube toward the skimmer; (ii) be deflected by the deflector toward the aperture; (iii) travel through aperture and into the particle guide; (iv) transit the length of the particle guide; and (v) be detected by the detector. At least some of the one or more uncharged particles may be configured to: (i) travel through the tube toward the skimmer; and (ii) be deposited on the contact surface.

Further variations encompassed within the systems and methods are described in the detailed description of the invention below.

DETAILED DESCRIPTION

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Figure 1:
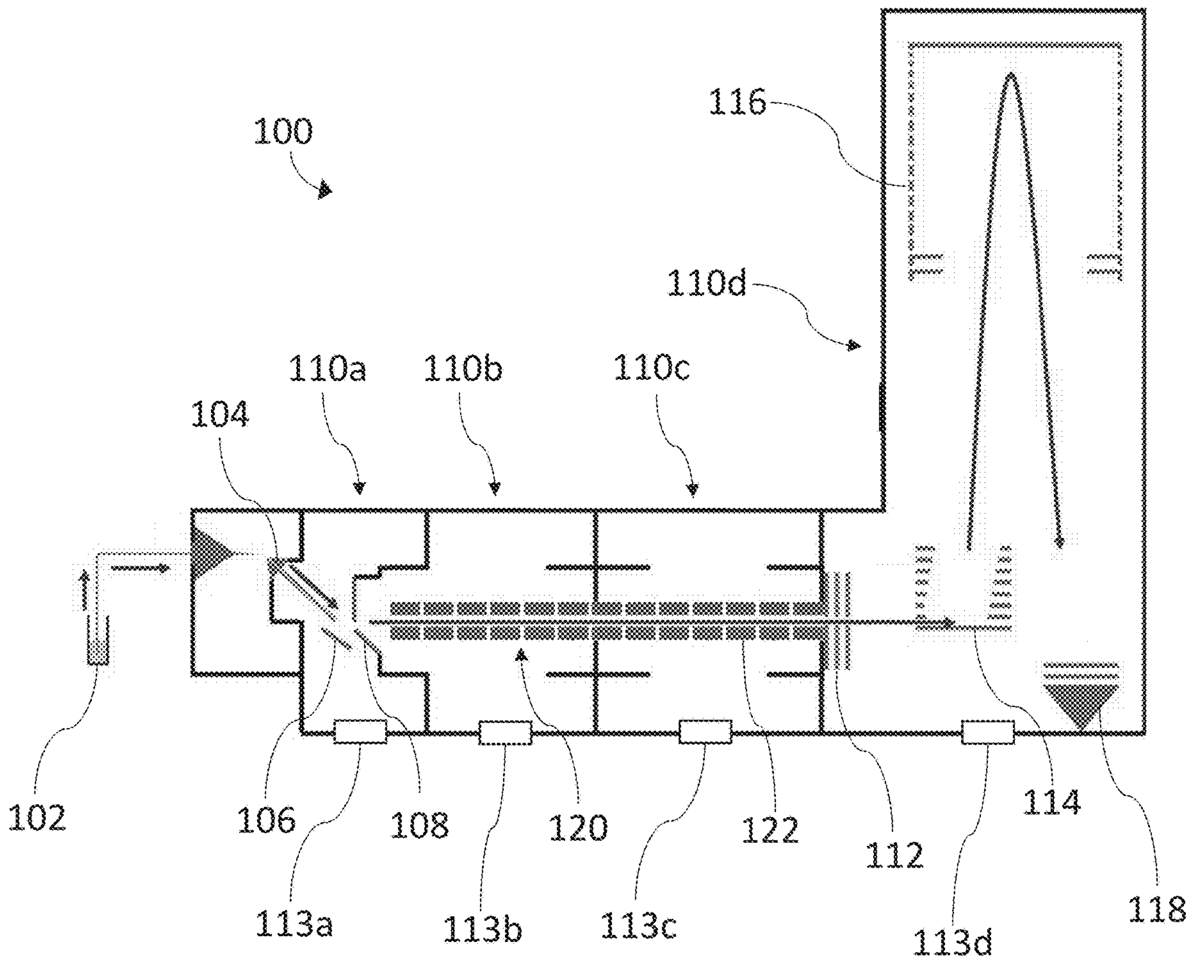
FIG. 1 shows a schematic diagram of an exemplary mass spectrometer.

FIG. 1 shows a schematic diagram of an exemplary mass spectrometer 100. In some embodiments, the mass spectrometer 100 may include a plurality of chambers 110_a_, 110_b_, 110_c_, 110_d_, each of which may have a different pressure. For example, chamber 110_a_ may have a pressure less than atmospheric pressure, and each of chambers 110_b_, 110_c_, 110_d_ may have progressively lower pressures, such that chamber 110_d_ has a sufficiently low pressure that air molecules will not affect (or will minimally affect) the flow of ions through the chamber 110*d* to a detector 118. In an exemplary embodiment, chamber 110*a* may have a pressure between 0.1 and 10 torr or, preferably, approximately 1 torr. Chamber 110*b* may have a pressure between 0.001 and 0.1 torr or, preferably, approximately 0.01 torr. Chamber 110*c* may have a pressure between $10^{-5}$ and $10^{-3}$ torr or, preferably, approximately $10^{-4}$ torr. Chamber 110*d* may have a pressure between $10^{-8}$ and $10^{-5}$ torr or, preferably, approximately $10^{-7}$ torr. In some embodiments, a greater or lesser number of chambers may optionally be provided, and the pressures in each chamber may optionally be varied from the values described herein.

In some embodiments, mass spectrometer 100 may include a source 102 configured to output one or more ions. In some embodiments, the source 102 may include a chamber in which a sample may be received. The source 102 may further include a device for applying energy to and ionizing molecules in the sample. In some embodiments, the source may use capillary electrophoresis and/or electrospray ionization. In some embodiments, ions may flow from the source 102 to a tube 104. Ions may flow from the tube 104 may toward a deflector 106 and then to a skimmer 108. The skimmer 108 may allow ions that are on an intended path to travel into a particle guide 120. Ions that deviate from the intended path may be blocked by the skimmer and may be prevented from entering the particle guide 120. Exemplary skimmer arrangements are described in greater detail below with respect to FIGS. 6A-6C.

In some embodiments, the particle guide 120 may include a quadrupole, as described in greater detail below with respect to FIGS. 3-5. The particle guide may include a plurality of segments 122 which may apply electric fields to guide and manipulate the flow of ions through a length of the particle guide. FIG. 1 shows an exemplary particle guide with thirteen quadrupole segments. Particle guides may optionally have a greater or lesser number of segments than shown in this embodiment. The particle guide may terminate at a lens gate 112, which may selectively allow ions to pass into chamber 110*d*. In some embodiments, lens gate 112 may be affixed to or integrated with particle guide 120. In other embodiments, lens gate 112 may be adjacent to particle guide 120. Lens gate 112 may have a first state in which it is open to passage of ions from particle guide 120 to chamber 110*d*, and it may have a second state in which it blocks the flow of ions from particle guide 120 to chamber 110*d*. Lens gate 112 may be configured to selectively switch between the first state and the second state based on signals provided by a controller.

In some embodiments, mass spectrometer 100 may include a pusher 114, a reflectron 116, and a detector 118. Pusher 114 may include a plurality of conductive elements (e.g., stacked plates that are electrically isolated from one-another) which may be selectively charged at different voltages. Ions may be configured to travel from lens gate 112 to a channel within pusher 114, and the pusher 114 may generate an electric gradient that causes the ions to accelerate through the pusher channel toward reflectron 116. Reflectron 116 may include a plurality of conductive rings or other elements that can be selectively charged at different voltages, thereby generating an electric gradient that is configured to reflect ions toward detector 118. Detector 118 may be configured to detect the arrival of each ion that contacts the detector 118 and record a precise time of each arrival. In some embodiments, detector 118 may be a microchannel plate, which may be configured to detect individual ions.

In use, a sample may be placed in source 102 and energized to produce ions. The ions may flow from source 102 to tube 104, to deflector 106, and through skimmer 108 to particle guide 120. Ions may then travel through particle guide 120, which may confine the travel of ions and, in some embodiments, reduce their kinetic energy. Ions may then travel through lens gate 112 and to pusher 114. Ions may be accelerated by pusher toward reflectron 116 and then reflected toward detector 118, where their time of arrival may be recorded.

An ion's time of flight from pusher 114 to detector 118 may vary based on the mass and charge of the ion. For example, ions with greater mass may accelerate more slowly at pusher 114 and reflectron 116, resulting in a longer time of flight to detector 118. Greater charge, conversely, may produce higher acceleration, resulting in a shorter time of flight to detector 118. By accurately measuring the time from when the pusher 114 begins accelerating the ions and when those ions arrive at detector 118, the mass and charge of the ions may be inferred, and the composition of the sample at source 102 may be analyzed.

Figure 2:
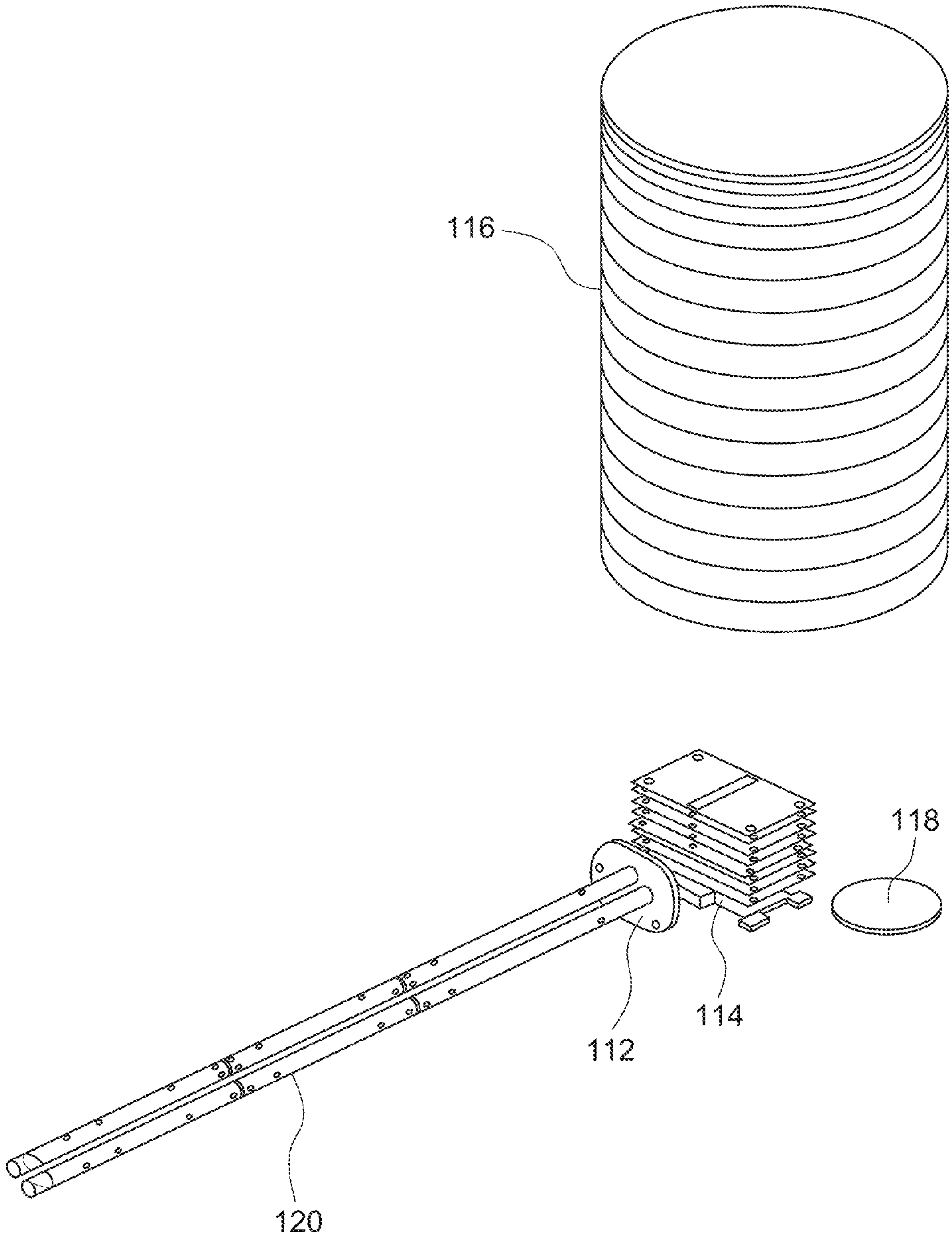
FIG. 2 shows a perspective view of certain components of a mass spectrometer.

FIG. 2 shows a perspective view of certain components of a mass spectrometer. As described above in the schematic diagram shown in FIG. 1, FIG. 2 shows a particle guide 120, a lens gate 112, a pusher 114, a reflectron 116, and a detector 118.

Figure 3:
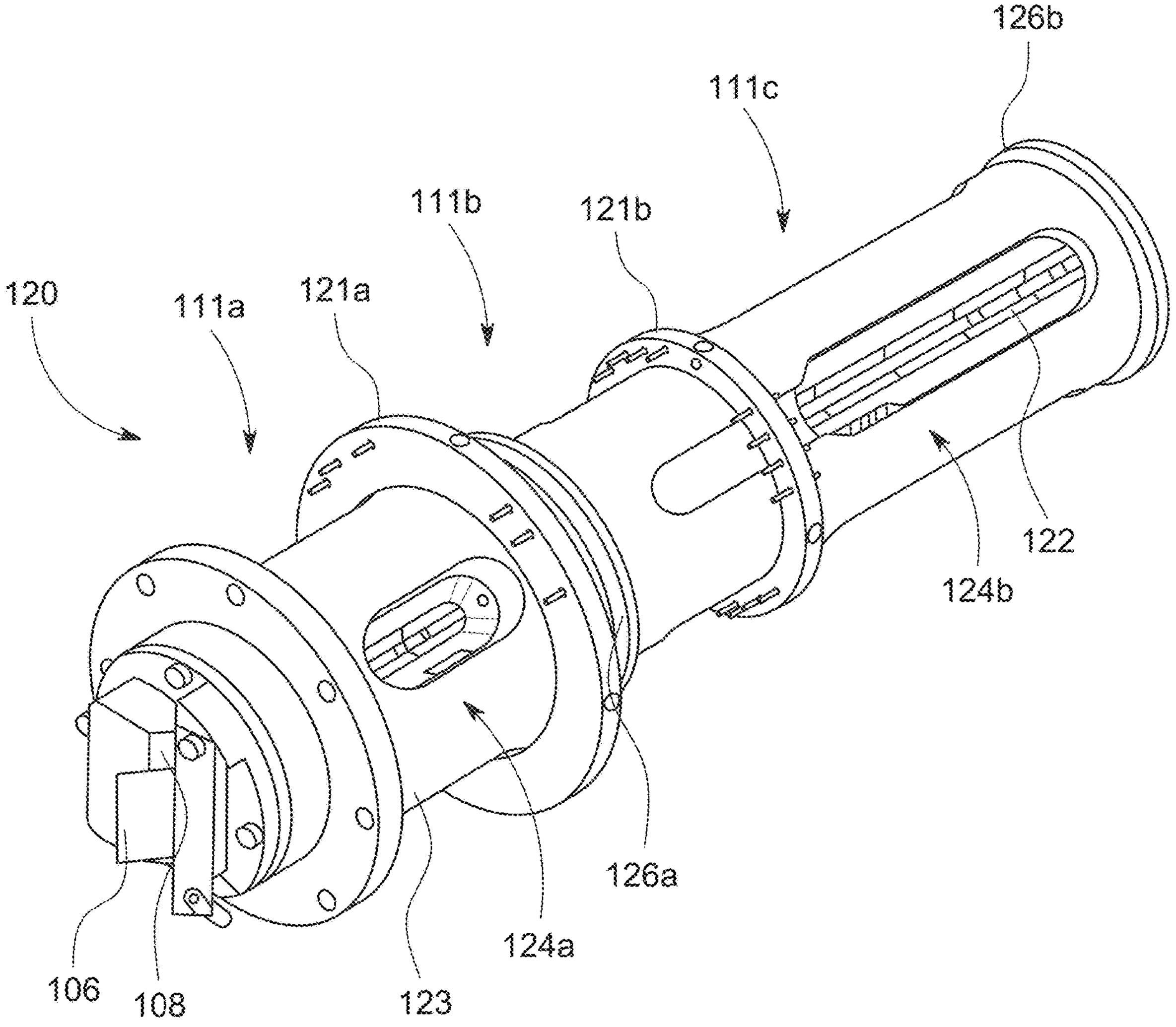
FIG. 3 shows an exemplary particle guide.

FIG. 3 shows an exemplary particle guide 120. Particle guide 120 may include a housing 123, which may enclose electrical components and provide a rigid support with which the particle guide 120 may be affixed within a mass spectrometer. A plurality of quadrupole segments 122 may be disposed within the housing 123. As shown in greater detail in FIGS. 4A and 4B, each quadrupole segment 122 may include four conductive members 128 which may be disposed around a central channel 130. The conductive members 128 may be selectively charged, such that the conductive members of a quadrupole segment, in conjunction with other quadrupole segments of the particle guide, may direct and manipulate the flow of ions through the central channel 130 of the particle guide. The central channel 130 may extend along an entire length of the particle guide.

In some embodiments, a deflector 106 and a skimmer 108 may be affixed to the particle guide. The deflector 106 and skimmer 108 may be configured to perform the functions described above with reference to FIG. 1 and below with reference to FIGS. 6A-6C.

The particle guide 120 may include sections 111*a*, 111*b*, 111*c*. In some embodiments, section 111*a* may be an open section that includes a vent 124*a* that provides a passage from an exterior of section 111*a* to the central channel 130. For example, the passage defined by vent 124*a* may extend between two of four conductors 128 of one or more quadrupole segments 122 in section 111*a*.

Section 111*c* may also be an open section. Section 111*c* may include a vent 124*b* that provides a passage from an exterior of section 111*c* to the central channel 130. For example, the passage defined by vent 124*b* may extend between two of four conductors 128 of one or more quadrupole segments 122 in section 111*c*. Section 111*b* may preferably be a closed section that does not include a vent. Additional open or closed sections may optionally be provided.

The particle guide 120, including sections 111*a*, 111*b*, 111*c*, may be disposed in a mass spectrometer having multiple chambers at different pressures. Section 111*a* may, for example, be disposed in a first chamber (such as chamber 110*b* in FIG. 1) having a first pressure, and section 111*c* may, for example, be disposed in a second chamber (such as chamber 110*c* in FIG. 1). Vent 124*a* may provide a passage from the first chamber to the central channel, and vent 124*b* may provide a passage from the second chamber to the central channel. Thus, the portion of the central channel near vent 124*a* may be equal or approximately equal to the pressure in the first chamber, and the portion of the central channel near vent 124*b* may be equal or approximately equal to the pressure in the second chamber.

A pressure differential may exist along the portion of the central channel spanning from the first vent 124*a* to the second vent 124*b*. The flow of air molecules may be limited by a fluid conductance of the closed section 111*b*. For example, a fluid conductance of the closed section 111*b* may be determined by a cross-sectional area of the opening in channel 130 and a length of the closed section. By making the fluid conductance sufficiently low (e.g., because the cross-sectional area is sufficiently small and the length of the closed section is sufficiently large), the flow of air from a higher-pressure chamber to a lower-pressure chamber may be reduced to a level that can be offset using a vacuum pump or other device, thereby maintaining the pressure differential at a desired state. In some embodiments, the length of the closed segment may be at least 1 cm, at least 40 cm, or, more preferably, at least 4 cm. In some embodiments, the open cross-sectional area of the channel 130 may be less than 0.05 cm 2, less than 5 cm 2, or, more preferably, less than 0.3 cm 2. In some embodiments, the fluid conductance of the closed section may be less than 0.01 liters per second, less than 10 liters per second, or more preferably, less than 1 liter per second. As illustrated in FIG. 1, one or more vacuum pumps 113*a*, 113*b*, 113*c*, 113*d* may be arranged to remove air molecules from chambers 110*a*, 110*b*, 110*c*, 110*d* respectively. The one or more vacuum pumps may be directly affixed to a housing of the mass spectrometer 100, or they may be coupled to the chambers via hoses. In some embodiments, the vacuum pumps may be roughing pumps, such as rotary vanes or scrolls, or a turbomolecular pump. In some embodiments, a higher-powered pump may be used for chambers 110*b*, 110*c*, and/or 110*d* than for chamber 110*a*. For example, a rotary vane may be connected to chamber 110*a*, and a three-stage turbo pump may be connected to chambers 110*b*, 110*c*, and 110*d*. Other pumping arrangements may be used.

When arranged in a mass spectrometer such as that shown in FIG. 1, open section 111*a* may be disposed in chamber 110*b*, open section 111*c* may be disposed in chamber 110*c*, and closed section 111*b* may be disposed across a juncture between chambers 110*a* and 110*b*. In this manner, a single particle guide may be disposed across multiple chambers at different pressures without producing unacceptable levels of gas flow across the chambers. This may advantageously reduce the number of separate particle guides that need to be provided and installed in a mass spectrometer, thereby reducing the cost of the mass spectrometer and improving the consistency and reliability of the device's performance.

Particle guide 120 may include one or more circumferential rings 121*a*, 121*b*, which may be configured to receive electrical contacts for controlling electric fields in the particle guide. In some embodiments, rings 121*a*, 121*b* may alternatively or additionally be used to provide mechanical supports against which the particle guide 120 may be affixed within a mass spectrometer. In some embodiments, the rings 121*a*, 121*b* may be replaced with mechanical supports having different geometries. For example, the supports may be protrusions extend for less than the full circumference of the housing or have flat outer surfaces (e.g., a triangular, rectangular, pentagonal, or hexagonal projection).

In some embodiments, particle guide 120 may also include one or more sealing rings 126*a*, 126*b*. Sealing rings 126*a*, 126*b* may be made from a deformable material such as rubber or an elastomeric polymer, such that a sealing connection may be formed when the sealing ring contacts a surface. In some embodiments, when the particle guide 120 is installed in a mass spectrometer, the sealing rings 126*a*, 126*b* may be aligned with and contact walls between adjacent chambers. For example, with reference to FIG. 1, sealing ring 126*a* may be disposed such that it contacts the inner surface of an aperture in the wall between chamber 110*b* and chamber 110*c*. Sealing ring 126*b* may be disposed such that it contacts the inner surface of an aperture in the wall between chamber 110*c* and chamber 110*d*.

Figure 4A:
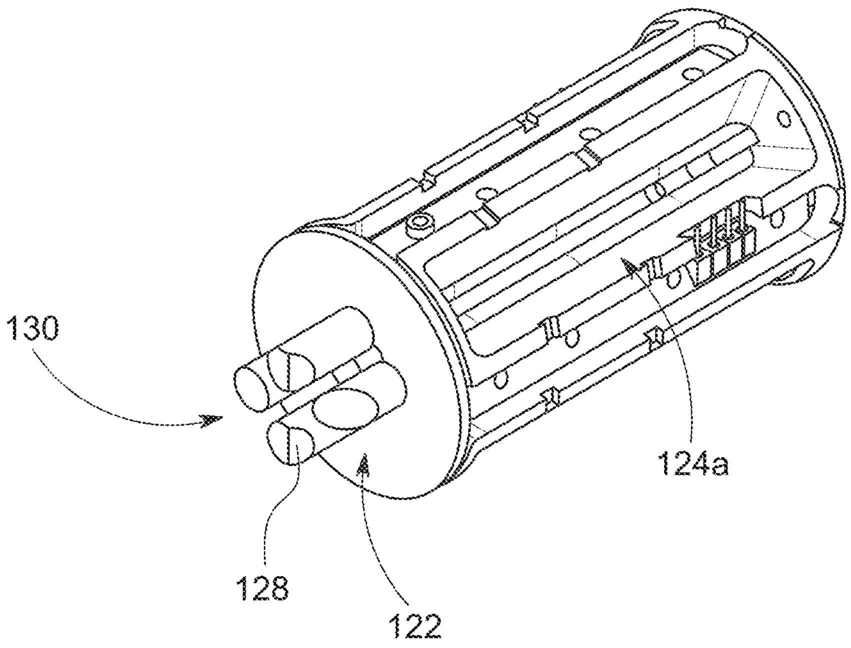
FIGS. 4A and 4B show additional views of the particle guide shown in FIG. 3.
Figure 4B:
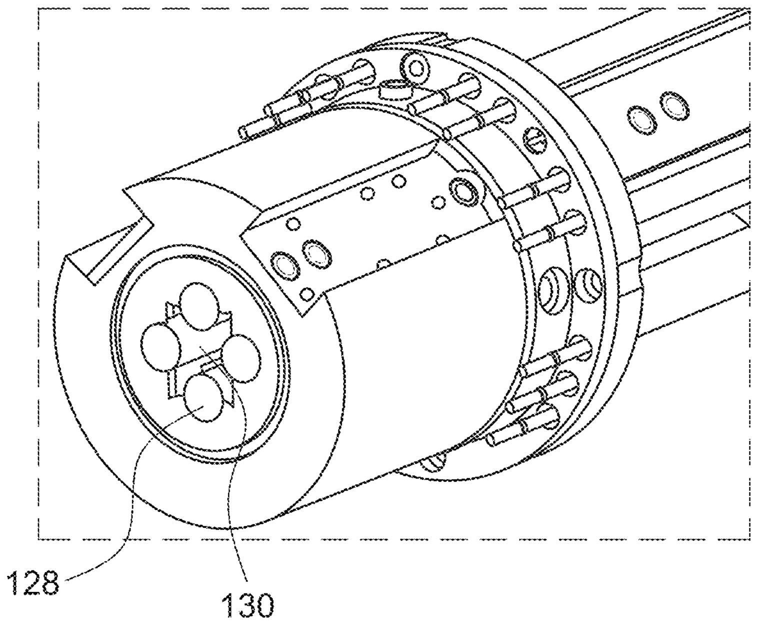

FIGS. 4A and 4B show cross-sectional views of the particle guide 120 shown in FIG. 3. In these figures, housing 123 has been omitted to more clearly show interior components of the particle guide 120.

FIG. 4A shows open section 111*a* of the particle guide 120. Particle guide 120 may include one or more quadrupole segments 122, each of which may include four conductive members 128 to which a voltage may be applied. Four quadrupole segments are visible in the section of the particle guide shown in FIG. 4A. The quadrupole segments 122 may be disposed around a central channel 130, which may define a path through which ions may flow through the length of the particle guide. Vent 124*a* may form a passage from an exterior of the particle guide to an interior of the particle guide 120 and, more specifically, to the central channel 130.

FIG. 4B shows closed section 111*b* of the particle guide 120. The open cross-sectional area of central channel 130 can be seen in FIG. 4B. By increasing or decreasing this cross-sectional area, a fluid conductance of the closed section may be modified.

Figure 5:
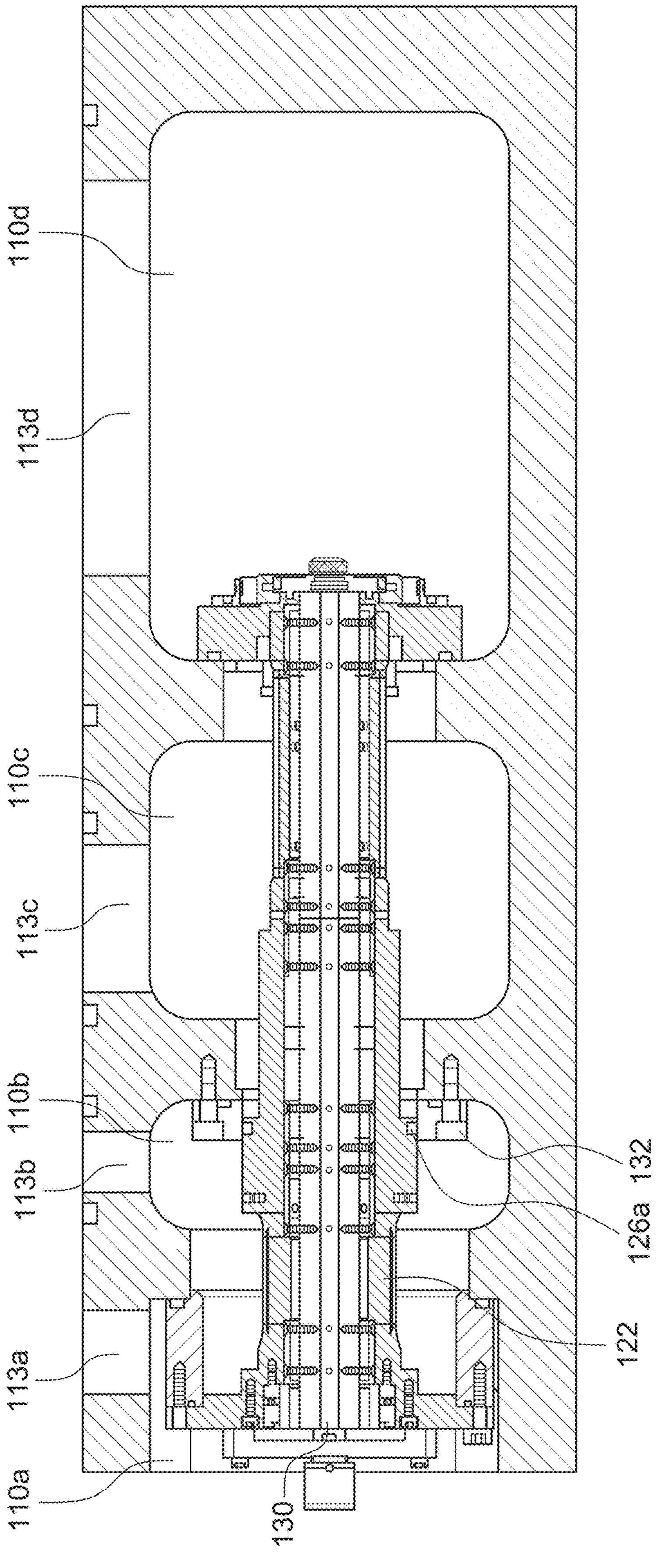
FIG. 5 shows a longitudinal cross-sectional view of the particle guide shown in FIG. 3.

FIG. 5 shows a longitudinal cross-sectional view of the particle guide 120 as installed in the mass spectrometer shown in FIG. 1. As shown in FIG. 5, a mounting piece 132 may be affixed via bolts or other fixtures to a wall disposed between chambers 110*b* and 110*c*. The mounting piece 132 may be pressure fitted or otherwise coupled to housing 123 of the particle guide. Sealing ring 126 may be disposed between mounting piece 132 and housing 123 to provide an airtight seal between these components. The same or similar structures may be provided at other sections where the particle guide 120 is affixed to the mass spectrometer. For example, the same or similar structures may be provided at a distal end of particle guide 120 (e.g., around sealing ring 126*b*) where particle guide 120 may be affixed to a wall between chamber 110*c* and chamber 110*d*.

Figure 6A:
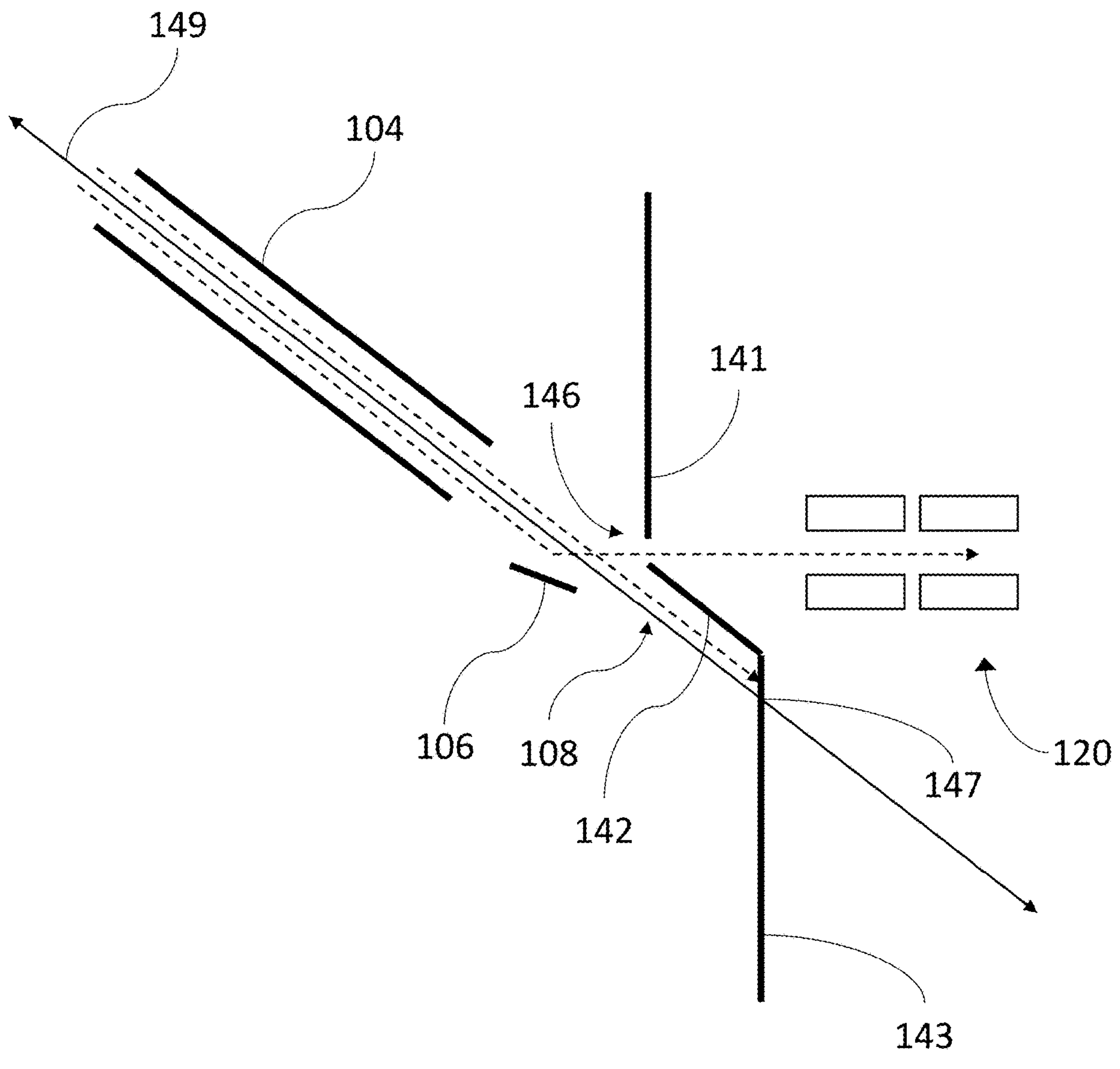
FIGS. 6A-6C show exemplary skimmer arrangements for receiving ions.
Figure 6B:
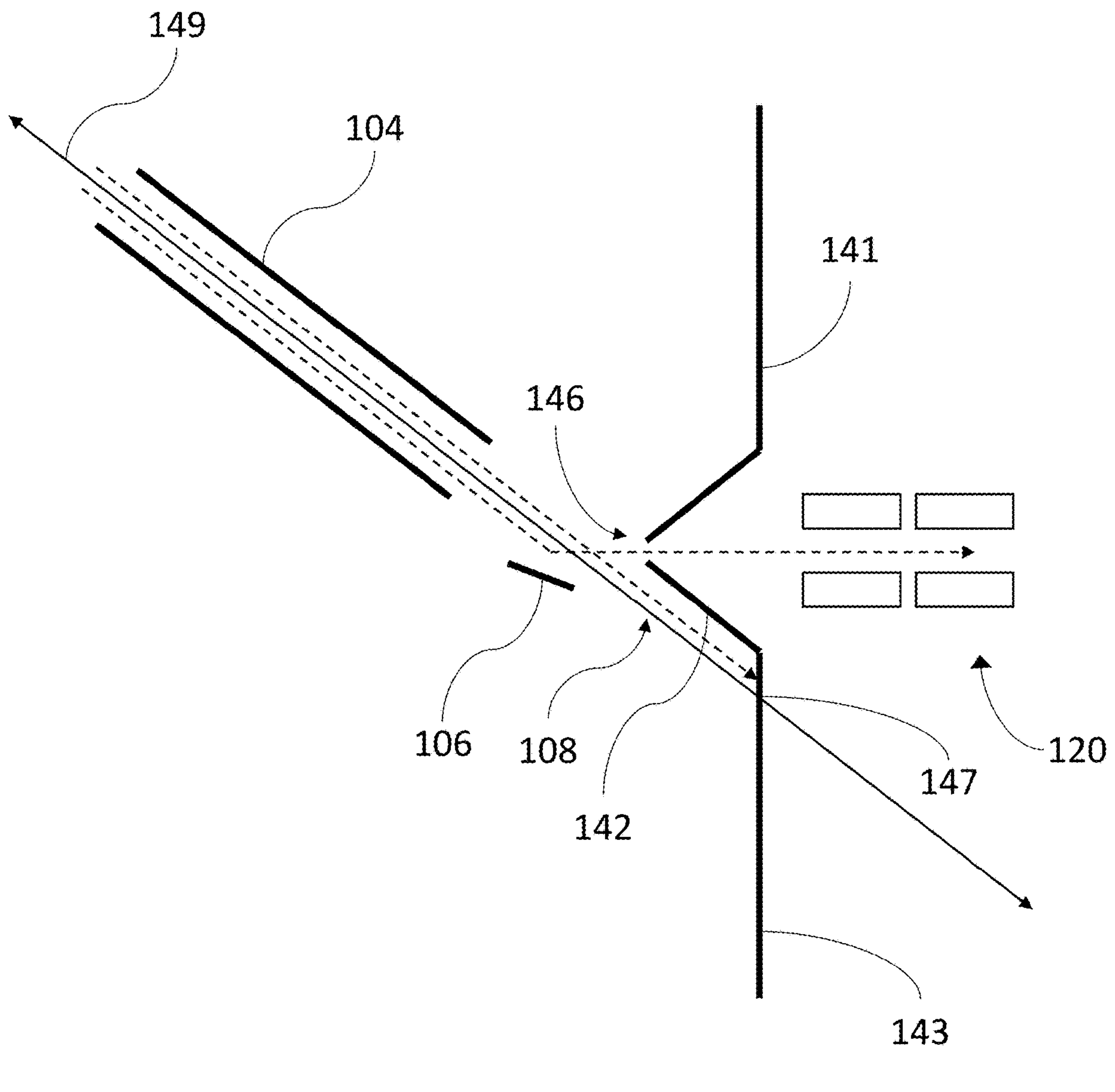
Figure 6C:
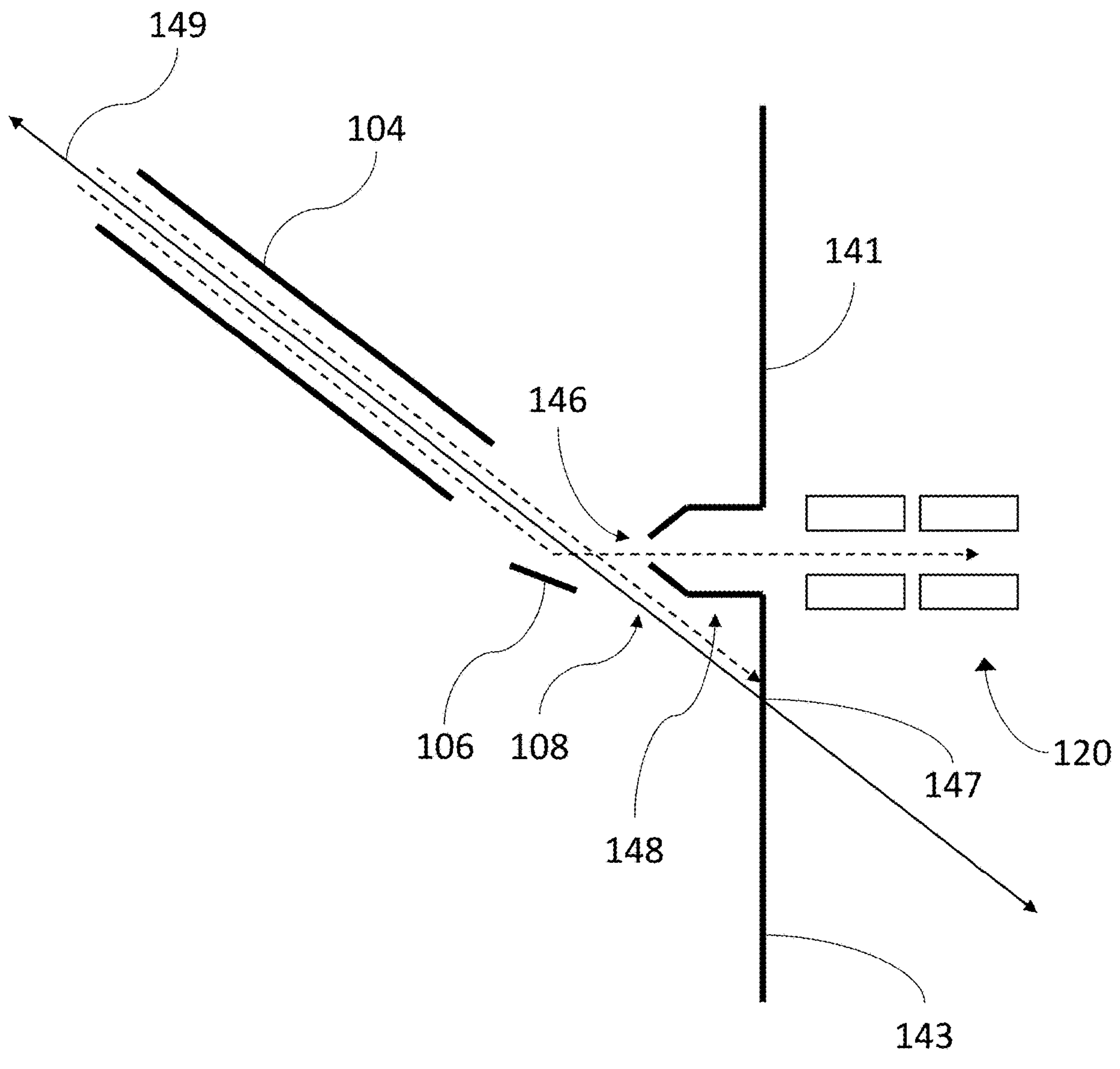

FIGS. 6A-6C show an exemplary skimmer arrangements for receiving ions. As shown in FIG. 6A, a skimmer arrangement may include one or more surfaces which may be geometrically arranged to reduce the risk of contamination surrounding an aperture 146. In the exemplary embodiment of FIG. 6A, a first surface 141 may be disposed at a nonzero angle relative to a second surface 143, and a third surface 143 may be disposed at a nonzero angle relative to the second surface 143. In some embodiments, the first surface 141 and the third surface 143 may be parallel to one-another or within 5 degrees of parallel to one-another. The second surface 142 may be disposed at an angle that is parallel to a central axis of tube 104. Alternatively, the second surface may be disposed at an angle that is closer to parallel to the central axis of tube 104 than are either of surface 141 or surface 143.

As described above with respect to FIG. 1, particles may generally flow from a source through a tube 104. As used herein, the term "particle" broadly includes collections of matter that can travel collectively as a unit through a mass spectrometer or portion thereof, and includes both individual molecules and larger groups of matter such as droplets, and may further include ions, heavy charged molecules or groups of matter, and neutral species. In some embodiments, tube 104 may be a capillary 104. A range of particles having different charge-to-mass ratios may enter the flowpath, where they may be deflected by a voltage on a deflector 106. As used herein, the term "deflector" broadly includes any element that has the purpose or effect of diverting a direction of a stream of charged particles, without regard to the element's geometry, and may include both flat and curved electrodes and other structures such as tubular lenses. Additionally, variations in particle trajectory may be observed.

Two exemplary, simplified flow paths are shown in dotted lines in FIG. 6A. In the case of a first particle path, the particle may be repelled by deflector 106 and directed through an aperture between in surface 141 or between surfaces 141 and 142 of skimmer 108 and into particle guide 120. A second particle may not be redirected or may be minimally redirected by deflector (e.g., due to low charge-to-mass ratio or misalignment) and may travel past the aperture and contact a surface 143 that is spaced a distance from the aperture. Surface 143 may include a point 147 that intersects a central axis 149 of tube 104. The geometry of the skimmer 108 may be such that point 147 is spaced a distance from aperture 146, and the central axis 149 has a clear path to point 147 (i.e., the central axis does not intersect another portion of skimmer 108 before reaching point 147). In some embodiments, the clear path may be such that a cylinder surrounding the central axis 149 having a radius of 1, 2, 3, or 5 mm may not intersect any portion of the skimmer until the cylinder reaches the point 147. In some embodiments, the distance between aperture 146 and point 147 may be at least 500 microns, at least 1 mm, at least 3 mm, at least 5 mm, at least 10 mm, at least 20 mm, at least 50 mm, or at least 100 mm.

FIGS. 6B and 6C show additional exemplary skimmer geometries. As shown in FIG. 6B, surface 142 may be a portion of a cone that extends toward or includes aperture 146. As shown in FIG. 6C, the aperture 146 may be disposed on an extension 148 or other surface that is spaced from surface 143. Optionally, the extension or spaced surface may include a cone or other portion having a surface that is substantially parallel to a central axis of tube 104. In other embodiments, this may be omitted, and the geometry of the extension or spaced surface may be used to ensure that uncharged particles which present a contamination risk predominantly travel a distance from the aperture 146. As in FIG. 6A, the geometries of the skimmer embodiments shown in FIGS. 6B and 6C may be such that point 147 is spaced a distance from aperture 146, and the central axis 149 has a clear path to point 147. The distance between aperture 146 and point 147 may be at least 500 microns, at least 1 mm, at least 3 mm, at least 5 mm, at least 10 mm, at least 20 mm, at least 50 mm, or at least 100 mm.

By angling surface 142 as shown in FIGS. 6A and 6B, particles that are not redirected or are minimally redirected by deflector will tend to travel a distance away from the aperture before contacting the skimmer. Alternatively, by using a projection or other spaced surface as shown in FIG. 6C, particles that are not redirected or are minimally redirected by deflector may likewise tend to travel a distance away from the aperture before contacting the skimmer. In some embodiments, at least 50%, at least 75%, at least 85%, at least 90%, at least 95%, at least 97%, at least 99%, or at least 99.5% of the uncharged particles that travel through the tube and are deposited on the skimmer may be deposited at least a distance from the aperture. In some embodiments, the distance may be at least 500 microns, at least 1 mm, at least 3 mm, at least 5 mm, at least 10 mm, at least 20 mm, at least 50 mm, or at least 100 mm. This may beneficially reduce the rate at which misaligned particles contact and are deposited on or around the aperture, where they can potentially become dislodged during future measurements and enter the particle guide. Notably, contamination issues are most frequently caused by droplets and heavy charged or neutral particles, which are not redirected or only minimally redirected by deflector 106. These particles may therefore reliably travel away from the aperture to surface 143, where they present little risk of contaminating future measurements. Accordingly, the skimmer arrangements shown in FIGS. 6A-6C may reduce the risk that deposited particles contaminate future measurements, thereby improving the accuracy and reliability of the mass spectrometer. Neutral gas molecules that travel through the tube may be predominantly pumped out of the mass spectrometer by a vacuum pump, rather than being deposited on a surface. While some heavier molecules may in theory be suspended in air traveling through the mass spectrometer and to deposit on surfaces within the mass spectrometer, this phenomenon has been found to cause minimal contamination.

Figure 7:
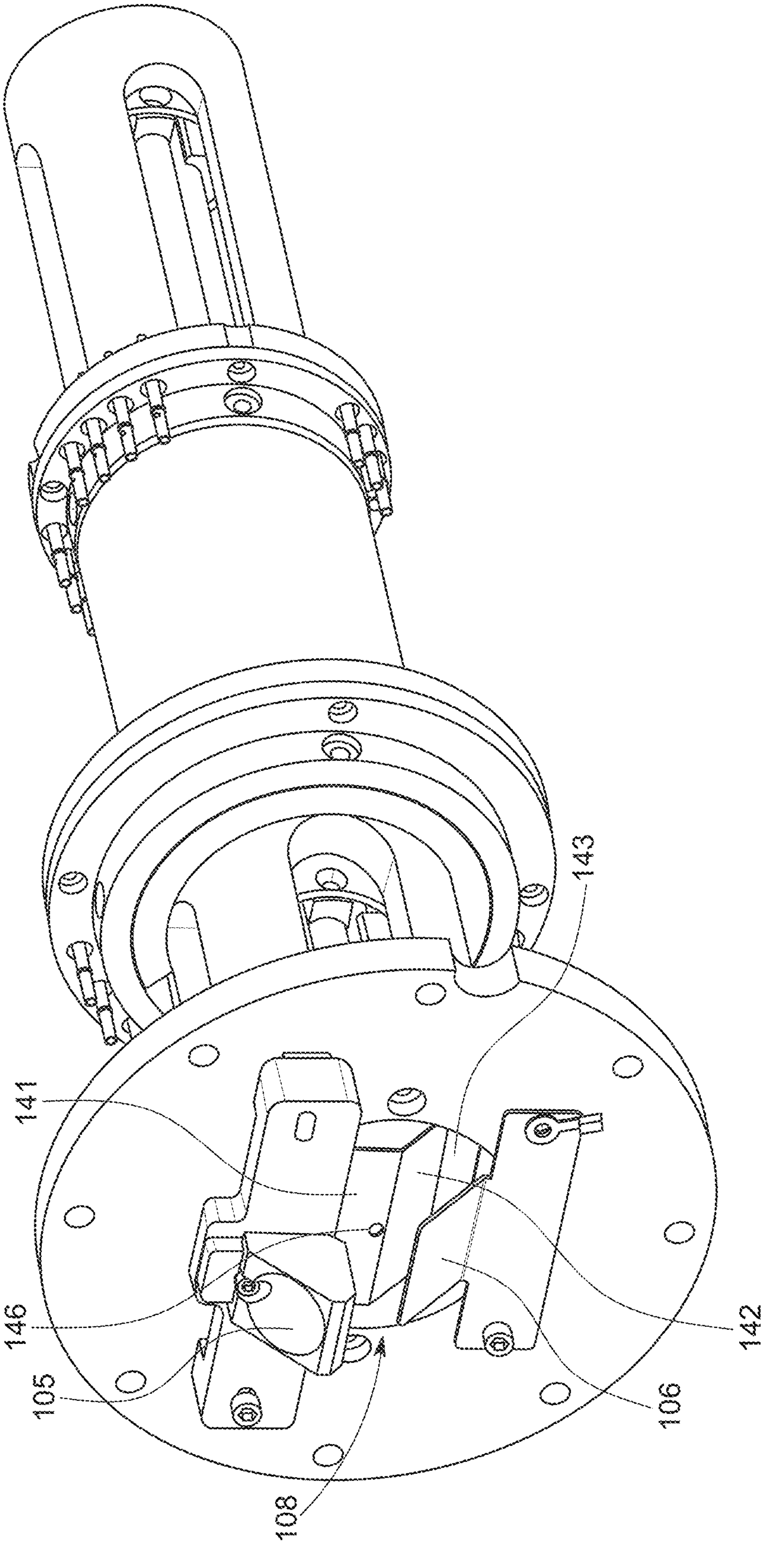
FIG. 7 shows a perspective view of an exemplary skimmer.

FIG. 7 shows a perspective view of an exemplary skimmer 108. As shown in FIG. 7, particles may approach skimmer 108 by traveling through a capillary disposed in recess 105. A voltage may be applied to deflector 106 such that deflector 106 may redirect charged particles as the exit the capillary. Charged particles may be redirected by deflector 106 into aperture 146 in surface 141, from which the particles may travel through a particle guide, such as the particle guides described above.

In some embodiments, surface 142 may be substantially parallel to a central axis of tube 104. For example, surface 142 may be within 30° of parallel to the central axis of tube 104, 20° of parallel to the central axis of tube 104, within 15° of parallel to the central axis of tube 104, 10° of parallel to the central axis of tube 104, within 8° of parallel to the central axis of tube 104, within 6° of parallel to the central axis of tube 104, within 4° of parallel to the central axis of tube 104, within 2° of parallel to the central axis of tube 104, or within 1° of parallel to the central axis of tube 104. In some embodiments, a distance between aperture 146 and the portion of surface 142 that is most proximate to aperture 146 may be less than 10 mm, less than 5 mm, less than 1 mm, less than 500 microns, less than 100 microns, less than 50 microns, or less than 10 microns.

Uncharged particles and particles with high mass-to-charge ratio may continue to travel along a path substantially parallel to the length of the capillary and may contact surface 143. These particles (and constituents thereof) may therefore be deposited a distance from aperture 146 and may present little risk of contaminating future measurements.

Figure 8:
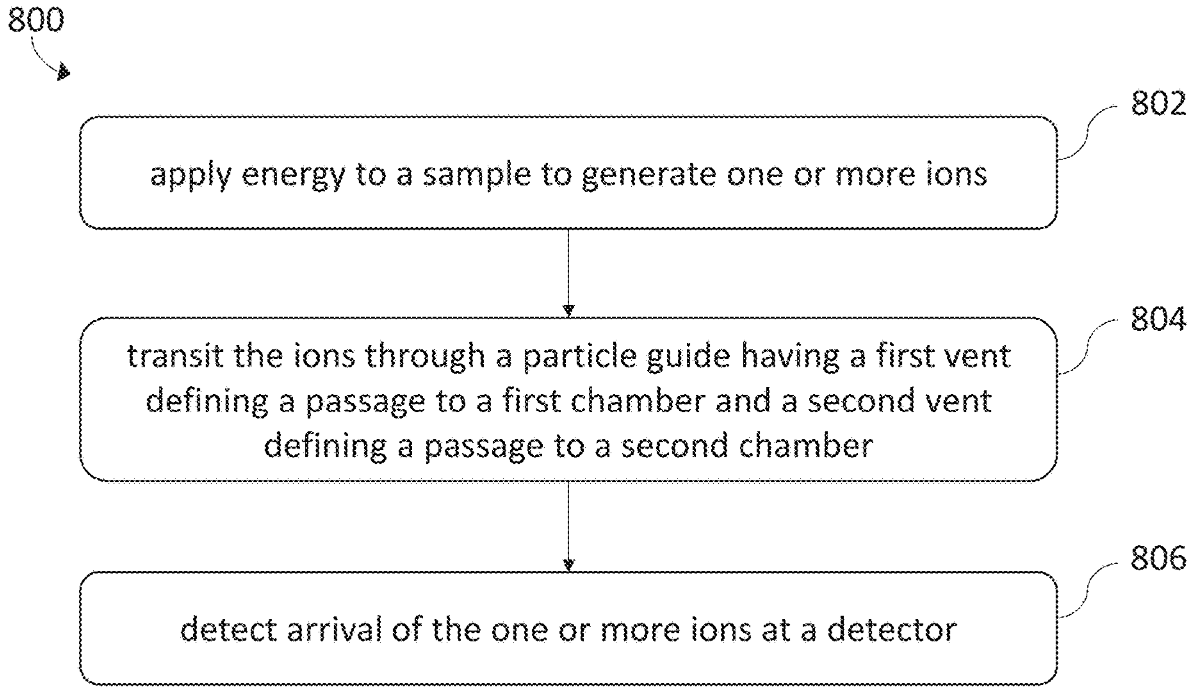
FIG. 8 shows an exemplary method for analyzing a sample.

FIG. 8 shows an exemplary method 800 for analyzing a sample. Method 800 may be performed using a mass spectrometer having a particle guide as generally described above with respect to FIGS. 1-5. For example, method 800 may be performed using a mass spectrometer having a plurality of chambers having different pressures including at least a first chamber having a first pressure that is less than atmospheric pressure and a second chamber having a second pressure that is less than the first pressure. The mass spectrometer may include a particle guide including a conduit through which the one or more ions may travel an entire length of the particle guide and a housing surrounding the conduit. The housing may define a first open section comprising a first vent, the first vent being configured to define a passage between the first chamber and the conduit, a second open section comprising a second vent, the second vent being configured to define a passage between the second chamber and the conduit, and a closed section disposed between the first open section and the second open section.

In step 802, energy may be applied to a sample to generate one or more ions. For example, capillary electrophoresis and/or electrospray ionization may be used to generate the ions. Ions may then flow from the sample toward the particle guide, optionally via one or more of a capillary, a deflector, and/or a skimmer. In step 804, the ions may be transited through the length of a particle guide. The particle guide may be disposed across multiple chambers of the mass spectrometer at different pressures. In some embodiments, the particle guide may have a first vent defining a passage to the first chamber of the mass spectrometer and a second vent defining a passage to the second chamber of the mass spectrometer. To reduce the flow of air molecules along a pressure differential between the chambers, the vents may be spaced by a closed section having a cross-sectional area and length selected to provide a sufficiently low fluid conductance. To maintain the desired pressure states, the chambers of the mass spectrometer may additionally be continuously or intermittently evacuated using a vacuum pump.

In step 806, a detector may detect an arrival of the ions at the detector. In some embodiments, the detector may be configured to detect the arrival of each ion that contacts the detector and record a precise time for each arrival. In some embodiments, detector may be a microchannel plate. In some embodiments, a time between when a pusher begins accelerating the ions and when those ions arrive at the detector may be analyzed to determine a composition of the sample.

Numbered Embodiments

Exemplary embodiments of the systems and methods disclosed herein are described in the numbered paragraphs below.

Embodiment 1. A mass spectrometer, the mass spectrometer comprising:
- a source configured to output a plurality of particles, the plurality of particles comprising one or more charged particles and one or more uncharged particles;
- a tube having a central axis;
- a deflector, the deflector being configured to be charged to deflect the one or more charged particles;
- a skimmer, the skimmer comprising:
  - an aperture, the aperture being arranged to receive the one or more charged particles deflected by the deflector; and
  - a contact surface comprising an intersection point that intersects the central axis of the tube, the intersection point being spaced from the aperture by a distance of at least 5 mm;
- a particle guide configured to transit the one or more charged particles along a length of the particle guide; and
- a detector configured to detect the one or more charged particles;

wherein:
- the one or more charged particles are configured to: (i) travel through the tube toward the skimmer; (ii) be deflected by the deflector toward the aperture; (iii) travel through aperture and into the particle guide; (iv) transit the length of the particle guide; and (v) be detected by the detector; and
- at least some of the one or more uncharged particles are configured to: (i) travel through the tube toward the skimmer; and (ii) be deposited on the contact surface.

Embodiment 2. The mass spectrometer of Embodiment 1, wherein the skimmer comprises a tube-aligned surface that extends in a direction that is within 20 degrees of parallel to the central axis of the tube.

Embodiment 3. The mass spectrometer of Embodiment 2, wherein the contact surface is disposed at a nonzero angle relative to the tube-aligned surface.

Embodiment 4. The mass spectrometer of any of Embodiments 2-3, wherein the tube-aligned surface is within 5 degrees of parallel to the central axis of the tube.

Embodiment 5. The mass spectrometer of any of Embodiments 2-3, wherein the tube-aligned surface is within 2 degrees of parallel to the central axis of the tube.

Embodiment 6. The mass spectrometer of any of Embodiments 1-5, wherein the skimmer is arranged such that at least 75% of the uncharged particles outputted by the source and deposited on the skimmer during a given period of use are deposited at least 3 mm from the aperture.

Embodiment 7. The mass spectrometer of any of Embodiments 1-6, wherein the skimmer is arranged such that at least 90% of the uncharged particles outputted by the source and deposited on the skimmer during a given period of use are deposited at least 3 mm from the aperture.

Embodiment 8. The mass spectrometer of any of Embodiments 1-7, wherein the skimmer is arranged such that at least 75% of the uncharged particles outputted by the source and deposited on the skimmer during a given period of use are deposited at least 5 mm from the aperture.

Embodiment 9. The mass spectrometer of any of Embodiments 1-8, wherein the skimmer is arranged such that at least 90% of the uncharged particles outputted by the source and deposited on the skimmer during a given period of use are deposited at least 5 mm from the aperture.

Embodiment 10. The mass spectrometer of any of Embodiments 1-9, wherein the intersection point is the closest portion of the skimmer to the tube that intersects the central axis.

Embodiment 11. A skimmer configured to be used in a mass spectrometer, the skimmer comprising:
- an aperture, the aperture being arranged to receive the one or more charged particles deflected by a deflector; and
- a contact surface comprising an intersection point that intersects the central axis of the tube, the intersection point being spaced from the aperture by a distance of at least 5 mm;
- wherein the skimmer is configured to be arranged in a mass spectrometer comprising the deflector, the tube, a particle guide, and a detector such that:
  - the plurality of particles may travel through the tube toward the skimmer, the plurality of particles comprising the one or more charged particles and one or more uncharged particles;
  - the one or more charged particles are configured to: (i) travel through the tube toward the skimmer; (ii) be deflected by the deflector toward the aperture; (iii) travel through aperture and into the particle guide;

(iv) transit a length of the particle guide; and (v) be detected by the detector; and at least some of the one or more uncharged particles are configured to: (i) travel through the tube toward the skimmer; and (ii) be deposited on the contact surface.

Embodiment 12. The skimmer of Embodiment 11, wherein the skimmer comprises a tube-aligned surface that extends in a direction that is within 20 degrees of parallel to the central axis of the tube.

Embodiment 13. The skimmer of Embodiment 12, wherein the contact surface is disposed at a nonzero angle relative to the tube-aligned surface.

Embodiment 14. The skimmer of any of Embodiments 12-13, wherein the tube-aligned surface is within 5 degrees of parallel to the central axis of the tube.

Embodiment 15. The skimmer of any of Embodiments 12-14, wherein the tube-aligned surface is within 2 degrees of parallel to the central axis of the tube.

Embodiment 16. The skimmer of any of Embodiments 11-15, wherein the skimmer is arranged such that at least 75% of the uncharged particles outputted by the source and deposited on the skimmer during a given period of use are deposited at least 3 mm from the aperture.

Embodiment 17. The skimmer of any of Embodiments 11-16, wherein the skimmer is arranged such that at least 90% of the uncharged particles outputted by the source and deposited on the skimmer during a given period of use are deposited at least 3 mm from the aperture.

Embodiment 18. The skimmer of any of Embodiments 11-17, wherein the skimmer is arranged such that at least 75% of the uncharged particles outputted by the source and deposited on the skimmer during a given period of use are deposited at least 5 mm from the aperture.

Embodiment 19. The skimmer of any of Embodiments 11-18, wherein the skimmer is arranged such that at least 90% of the uncharged particles outputted by the source and deposited on the skimmer during a given period of use are deposited at least 5 mm from the aperture.

Embodiment 20. The skimmer of any of Embodiments 11-19, wherein the intersection point is the closest portion of the skimmer to the tube that intersects the central axis.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A mass spectrometer, the mass spectrometer comprising:

a source configured to output a plurality of particles, the plurality of particles comprising one or more charged particles and one or more uncharged particles;

a tube having a central axis;

a deflector, the deflector being configured to be charged to deflect the one or more charged particles;

a skimmer, the skimmer comprising:

an aperture, the aperture being arranged to receive the one or more charged particles deflected by the deflector; and a contact surface comprising an intersection point that intersects the central axis of the tube, the intersection point being spaced from the aperture by a distance of at least 5 mm;

a particle guide configured to transit the one or more charged particles along a length of the particle guide; and a detector configured to detect the one or more charged particles;

wherein:

the one or more charged particles are configured to: (i) travel through the tube toward the skimmer; (ii) be deflected by the deflector toward the aperture; (iii) travel through aperture and into the particle guide; (iv) transit the length of the particle guide; and (v) be detected by the detector; and at least some of the one or more uncharged particles are configured to: (i) travel through the tube toward the skimmer; and (ii) be deposited on the contact surface.

2. The mass spectrometer of claim 1, wherein the skimmer comprises a tube-aligned surface that extends in a direction that is within 20 degrees of parallel to the central axis of the tube.

3. The mass spectrometer of claim 2, wherein the contact surface is disposed at a nonzero angle relative to the tube-aligned surface.

4. The mass spectrometer of claim 2, wherein the tube-aligned surface is within 5 degrees of parallel to the central axis of the tube.

5. The mass spectrometer of claim 2, wherein the tube-aligned surface is within 2 degrees of parallel to the central axis of the tube.

6. The mass spectrometer of claim 1, wherein the skimmer is arranged such that at least 75% of the uncharged particles outputted by the source and deposited on the skimmer during a given period of use are deposited at least 3 mm from the aperture.

7. The mass spectrometer of claim 1, wherein the skimmer is arranged such that at least 90% of the uncharged particles outputted by the source and deposited on the skimmer during a given period of use are deposited at least 3 mm from the aperture.

8. The mass spectrometer of claim 1, wherein the skimmer is arranged such that at least 75% of the uncharged particles outputted by the source and deposited on the skimmer during a given period of use are deposited at least 5 mm from the aperture.

9. The mass spectrometer of claim 1, wherein the skimmer is arranged such that at least 90% of the uncharged particles outputted by the source and deposited on the skimmer during a given period of use are deposited at least 5 mm from the aperture.

10. The mass spectrometer of claim 1, wherein the intersection point is the closest portion of the skimmer to the tube that intersects the central axis.

11. A skimmer configured to be used in a mass spectrometer, the skimmer comprising:

an aperture, the aperture being arranged to receive one or more charged particles deflected by a deflector; and a contact surface comprising an intersection point that intersects a central axis of a tube, the intersection point being spaced from the aperture by a distance of at least 5 mm;

wherein the skimmer is configured to be arranged in a mass spectrometer comprising the deflector, the tube, a particle guide, and a detector such that:

a plurality of particles may travel through the tube toward the skimmer, the plurality of particles comprising the one or more charged particles and one or more uncharged particles;

the one or more charged particles are configured to: (i) travel through the tube toward the skimmer; (ii) be deflected by the deflector toward the aperture; (iii) travel through aperture and into the particle guide; (iv) transit a length of the particle guide; and (v) be detected by the detector; and at least some of the one or more uncharged particles are configured to: (i) travel through the tube toward the skimmer; and (ii) be deposited on the contact surface.

12. The skimmer of claim 11, wherein the skimmer comprises a tube-aligned surface that extends in a direction that is within 20 degrees of parallel to the central axis of the tube.

13. The skimmer of claim 12, wherein the contact surface is disposed at a nonzero angle relative to the tube-aligned surface.

14. The skimmer of claim 12, wherein the tube-aligned surface is within 5 degrees of parallel to the central axis of the tube.

15. The skimmer of claim 12, wherein the tube-aligned surface is within 2 degrees of parallel to the central axis of the tube.

16. The skimmer of claim 11, wherein the skimmer is arranged such that at least 75% of the uncharged particles outputted by the source and deposited on the skimmer during a given period of use are deposited at least 3 mm from the aperture.

17. The skimmer of claim 11, wherein the skimmer is arranged such that at least 90% of the uncharged particles outputted by the source and deposited on the skimmer during a given period of use are deposited at least 3 mm from the aperture.

18. The skimmer of claim 11, wherein the skimmer is arranged such that at least 75% of the uncharged particles outputted by the source and deposited on the skimmer during a given period of use are deposited at least 5 mm from the aperture.

19. The skimmer of claim 11, wherein the skimmer is arranged such that at least 90% of the uncharged particles outputted by the source and deposited on the skimmer during a given period of use are deposited at least 5 mm from the aperture.

20. The skimmer of claim 11, wherein the intersection point is the closest portion of the skimmer to the tube that intersects the central axis.

* * * * *